United States Patent Office 2,761,865
Patented Sept. 4, 1956

2,761,865

PYRIDYLALKYL SULFONES

Moses Wolf Goldberg, Upper Montclair, and Sidney Teitel, Nutley, N. J., assignors to Hoffmann-La Roche Inc., Nutley, N. J., a corporation of New Jersey No Drawing. Application July 7, 1954,
Serial No. 441,948

9 Claims. (Cl. 260—294.8)

This invention relates to pyridylalkyl sulfones and derivatives thereof. More particularly, this invention relates to pyridylalkyl aryl sulfones and salts thereof. In its preferred embodiment this invention relates to pyridylalkyl sulfones derived from benzenesulfinic acid, toluenesulfinic acid and nuclearly substituted derivatives of these acids, as well as salts of the novel sulfones.

The compounds of this invention are represented by the following formula

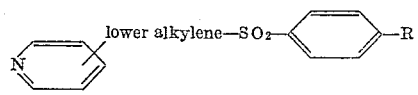

wherein R represents hydrogen, lower alkyl, amino or acylamino, and salts thereof. Preferably, the lower alkylene group is a straight chain aliphatic hydrocarbon group containing 1 or 2 carbon atoms, and the pyridyl group is attached to the lower alkylene chain at the 2 or 4 position of the heterocyclic ring. The aryl groups represented by

in the above formula include phenyl or substituted phenyl groups such as lower alkylphenyl, aminophenyl and acylaminophenyl, e. g. acetaminophenyl. Salts of the compounds defined by the above formula, e. g. those formed with the nitrogen atom of the pyridyl group, are particularly within the scope of this invention. Such salts include acid addition salts such as the hydrohalides, sulfates and benzenesulfonates, and quaternary salts such as the alkyl halide, alkenyl halide, aryl halide, aralkyl halide, nuclearly substituted aralkyl halide and phenacyl halide quaternary salts.

The compounds of this invention are obtained by reacting a pyridyl compound, for example a pyridylalkyl halide, with a benzenesulfinic acid, a toluenesulfinic acid or an acetaminobenzenesulfinic acid salt, such as an alkali metal salt, in a neutral solvent. The neutral solvents include acetone, acetonitrile, ether, dimethylformamide, etc. Alternatively, a vinyl pyridine may be reacted with the free sulfinic acid compound, preferably in a liquid reaction medium such as water, or an organic solvent or mixtures thereof.

Salts of the pyridylalkyl aryl sulfones, for example acid addition salts, are produced by reacting the free base, for example, with a mineral acid such as hydrochloric acid. Quaternary salts are synthesized by reacting the base with a quaternizing agent in an organic solvent for the base. Suitable quaternizing agents include alkyl halides such as methyl bromide, ethyl bromide, propyl bromide, amyl bromide, octyl bromide, or the corresponding chlorides or iodides; alkenyl halides such as allyl bromide; active aryl halogenides such as p-nitrochlorobenzene; aralkyl halides such as benzyl bromide; and phenacyl halides such as phenacyl chloride. The aryl group in the quaternizing agents may be nuclearly substituted, e. g. p-nitrobenzyl bromide. Solvents for the quaternizing reaction include acetone, acetonitrile, dimethylformamide, nitromethane, etc.

p-Aminobenzene sulfones of this class can be produced, for example, by deacetylating the corresponding p-acetaminobenzene sulfone with a strong aqueous acid.

The compounds of this invention are useful as anthelmintics, e. g. they are active against worms of the family of Oxyuridae.

*Example 1*

4-chloromethylpyridine hydrochloride was prepared by treating 34 grams of 4-hydroxymethylpyridine hydrochloride with 50 grams of phosphorus pentachloride (in portions). When the heat of reaction subsided, 70 ml. of chloroform was added. The mixture was refluxed for 3 hours. The volatiles were distilled off and the residue crystallized from 50 ml. of ethanol.

13.4 grams (0.096 mol) of 4-chloromethylpyridine hydrochloride were dissolved in 30 ml. of ice water, the solution was made alkaline with sodium carbonate and quickly extracted with three 15 ml. portions of benzene. The benzene extracts were washed with water and dried with sodium sulfate. The dried benzene extract was added to 17 grams (0.096 mol) of sodium p-toluene-sulfinate dissolved in 200 ml. of dimethylformamide. The mixture was stirred and refluxed for 18 hours, cooled, and the reaction product was then filtered off, washed with water and dried. The p-tolyl 4-pyridylmethyl sulfone, M. P. 185–186° C. with decomposition, was crystallized from acetone-ether.

Calculated for $C_{13}H_{13}NO_2S$: C, 63.14; H, 5.30. Found: C, 62.94; H, 5.12.

*Example 2*

To 32.8 grams (0.2 mol) of the sodium salt of benzenesulfinic acid was added 200 ml. of 1N hydrochloric acid. 21 grams (0.2 mol) of 4-vinylpyridine were added to the stirred suspension. The mixture was stirred and heated on a steam bath for 7 hours and then cooled. The dark green oily layer of 2-(4-pyridyl)ethyl phenyl sulfone which formed was separated and dissolved in acetone to give a total volume of 100 ml. [50 ml. equivalent to 0.1 mol of 2-(4-pyridyl)ethyl phenyl sulfone].

50 ml. of the above acetone solution were saturated with dry hydrogen chloride gas. The volatiles were distilled off in vacuo and the residue was crystallized from methanol-ethanol-ether. The hydrochloride of 2-(4-pyridyl)-ethyl phenyl sulfone melted at 178–180° C. with decomposition.

Calculated for $C_{13}H_{13}NO_2S.HCl$: C, 55.01; H, 4.97. Found: C, 55.06; H, 4.92.

*Example 3*

50 ml. of the acetone solution containing 0.1 mol of 2-(4-pyridyl)ethyl phenyl sulfone, described in Example 2, were added to 100 ml. of an ice cold 40% methyl bromide solution in acetone. The solution, in a tightly stoppered flask, was allowed to warm slowly to room temperature and was then stored overnight. The solid which formed was filtered off and crystallized from 95% ethanol-acetone-ether. The 1-methyl-4-(2-phenylsulfonylethyl)pyridinium bromide hemihydrate melted at 90–92° C.

Calculated for $C_{14}H_{16}BrNO_2S.½H_2O$__ C, 47.87; H, 4.88
Found _____ C, 47.77; H, 4.97
 47.74;   5.12

*Example 4*

42.8 grams (0.24 mol) of sodium p-toluenesulfinate were dissolved in 300 ml. of ice-water. The solution was acidified with dilute hydrochloric acid, the precipitated p-toluenesulfinic acid was filtered off, washed with ice-water and then suspended in 200 ml. of water. 21 grams (0.2 mol) of 4-vinylpyridine were added. The mixture was stirred and heated on a steam bath for 8 hours, evaporated to dryness and the residual gum was crystallized from 60% ethanol. The crystals were filtered off, washed free of color with 25% ethanol and dried. The product, 2-(4-pyridyl)ethyl p-tolyl sulfone, was recrystallized from ethyl acetate-ether, M. P. 95–96° C.

Calculated for $C_{14}H_{15}NO_2S$: C, 64.36; H, 5.79. Found: C, 64.32; H, 5.51.

An aliquot of the product obtained above was treated with alcoholic hydrochloric acid. The hydrochloride of 2-(4-pyridyl)ethyl p-tolyl sulfone was crystallized from 95% ethanol-ether, M. P. 176–177° C. with decomposition.

Calculated for $C_{14}H_{15}NO_2S \cdot HCl$: C, 56.45; H, 5.42. Found: C, 56.17; H, 5.37.

Example 5

19.5 grams (0.075 mol) of 2-(4-pyridyl)ethyl p-tolyl sulfone were dissolved in 100 ml. of ice cold acetone containing 40% of methyl bromide by weight. The solution, in a tightly stoppered flask, was allowed to warm slowly to room temperature, and stored overnight. The crystals that had formed were filtered off, washed with acetone and dried. The hemihydrate of the methobromide of 2-(4-pyridyl)ethyl p-tolyl sulfone, M. P. 83–85° C. was recrystallized from ethanol-ethyl acetate.

Calculated for $C_{15}H_{18}BrNO_2S \cdot \frac{1}{2}H_2O$: C, 49.31; H, 5.24. Found: C, 49.24; H, 5.23.

Example 6

To 10 grams (0.038 mol) of 2-(4-pyridyl)ethyl p-tolyl sulfone (prepared according to the procedure described in Example 4) were added 10 ml. of ethyl bromide in 40 ml. of nitromethane. The solution was heated in a sealed tube at 65° C. for 16 hours. The solution was cooled and the volatiles were distilled off. The residue was crystallized from acetonitrile-ether. The 4-[2-(p-tolylsulfonyl)ethyl]-1-ethylpyridinium bromide melted at 150–151° C.

Calculated for $C_{16}H_{20}BrNO_2S$: C, 51.90; H, 5.44. Found: C, 52.13; H, 5.61.

Example 7

To 13 grams (0.05 mol) of 2-(4-pyridyl)ethyl p-tolyl sulfone were added 16 ml. of n-butyl bromide in 50 ml. of nitromethane. The solution was heated in a sealed tube at 65° C. for 16 hours. The solution was cooled and the volatiles were distilled off. The residue was crystallized from acetonitrile-ether. The 4-[2-(p-tolylsulfonyl)ethyl]-1-butylpyridinium bromide melted at 152–153° C.

Calculated for $C_{18}H_{24}BrNO_2S$: C, 54.26; H, 6.07. Found: C, 54.51; H, 6.30.

Example 8

To 8.5 grams (0.033 mol) of 2-(4-pyridyl)ethyl p-tolyl sulfone were added 7.1 grams (0.033 mol) of p-nitrobenzyl bromide in 100 ml. of nitromethane. The solution was heated in a sealed tube at 65° C. for 16 hours. The solution was cooled and the volatiles were distilled off. The residue was crystallized from 95% ethanol. The 4-[2-(p-tolylsulfonyl)ethyl]-1-p-nitrobenzylpyridinium bromide melted at 171–172° C. with decomposition.

Calculated for $C_{21}H_{21}BrN_2O_4S$: C, 52.84; H, 4.43. Found: C, 53.01; H, 4.53.

Example 9

To 250 grams (1.25 mols) of p-acetaminobenzenesulfinic acid suspended in 800 ml. of water were added 115 grams (1.2 mols) of 4-vinylpyridine. The mixture was stirred and heated on a steam bath for 15 hours. The crystals which formed on cooling were filtered off, washed with water, dried and recrystallized from water. The p-acetamidophenyl 2-(4-pyridyl)ethyl sulfone hemihydrate melted at 103–105° C.

Calculated for $C_{15}H_{16}N_2O_3S \cdot \frac{1}{2}H_2O$: C, 57.48; H, 5.47. Found: C, 57.22; H, 5.95.

An aliquot of the above compound was treated with alcoholic hydrochloric acid and the hydrochloride of p-acetamidophenyl 2-(4-pyridyl)ethyl sulfone, M. P. 220–221° C. with decomposition, was obtained. The compound was recrystallized from water-ethanol.

Calculated for $C_{15}H_{16}N_2O_3S \cdot HCl$: C, 52.86; H, 5.03. Found: C, 52.91; H, 4.84.

Example 10

6.2 grams (0.02 mol) of p-acetamidophenyl 2(4-pyridyl)ethyl sulfone hemihydrate (prepared according to the procedure described in Example 9) were dissolved in 100 ml. of 3N hydrochloric acid and refluxed for 6 hours. The volatiles were distilled off and the residue was crystallized from water-ethanol-ether to obtain the hydrochloride of p-aminophenyl 2-(4-pyridyl)ethyl sulfone, M. P. 187–188° C. with decomposition.

Calculated for $C_{13}H_{14}N_2O_2S \cdot HCl$: C, 52.25; H, 5.06. Found: C, 52.76; H, 5.40.

Neutralization of the compound obtained above with aqueous sodium carbonate gave the free base, p-aminophenyl 2-(4-pyridyl)ethyl sulfone, which upon recrystallization from water melted at 150–152° C.

Calculated for $C_{13}H_{14}N_2O_2S$: C, 59.53; H, 5.38. Found: C, 60.09; H, 5.39.

Example 11

31.3 grams (0.1 mol) of p-acetamidophenyl 2-(4-pyridyl)ethyl sulfone (obtained as described in Example 9) was dissolved in 200 ml. of ice cold acetone containing 40% methyl bromide by weight. The solution, in a tightly stoppered flask, was allowed to warm slowly to room temperature, then was stored overnight. The crystals that had formed were filtered off, washed with acetone and dried. The methobromide of p-acetamidophenyl 2-(4-pyridyl)ethyl sulfone, recrystallized from methanol-ethanol-ether, melted at 187–188° C., with decomposition.

Calculated for $C_{16}H_{19}BrN_2O_3S$: C, 48.13; H, 4.80. Found: C, 48.45; H, 5.13.

Example 12

To 12 grams (0.03 mol) of the methobromide of p-acetamidophenyl 2-(4-pyridyl)ethyl sulfone, obtained in Example 11, dissolved in 100 ml. of water were added 10 ml. of 48% hydrobromic acid. The solution was refluxed for 3 hours and then evaporated to dryness. The syrup thus obtained was crystallized from 95% ethanol-ether. The methobromide of p-aminophenyl 2-(4-pyridyl)ethyl sulfone melted at 191–193° C. with decomposition.

Calculated for $C_{14}H_{17}BrN_2O_2S$: C, 47.06; H, 4.80. Found: C, 47.04; H, 4.63.

Example 13

To a solution of 31.3 grams (0.1 mol) of p-acetamidophenyl 2-(4-pyridyl)ethyl sulfone (prepared as described in Example 9) in 125 ml. of acetonitrile were added 39 grams (0.31 mol) of n-propyl bromide. The solution was heated in a sealed tube at 125° C. for 8 hours, cooled, and the crystals which had formed were filtered off, washed with acetonitrile and dried. A crystalline solid, the n-propyl bromide of p-acetamidophenyl 2-(4-pyridyl)ethyl sulfone, M. P. 183–185° C. with decomposition, was obtained upon recrystallization from ethanol-ether.

Calculated for $C_{18}H_{23}BrN_2O_3S$: C, 50.58; H, 5.42. Found: C, 50.75; H, 5.41.

Example 14

To a solution of 31.3 grams (0.1 mol) of p-acetamidophenyl 2-(4-pyridyl)ethyl sulfone in 125 ml. of acetonitrile were added 39 grams (0.31 mol) of isopropyl bromide. The solution was heated in a sealed tube at 125° C. for 8 hours, cooled, and the crystals which had formed were filtered off, washed with acetonitrile and dried. The crystalline solid which was obtained, 4-[2-(4 - acetamidophenylsulfonyl)ethyl] - 1 - isopropylpyridinium bromide, was recrystallized from ethanol-ether, M. P. 181–183° C.

Calculated for $C_{18}H_{23}BrN_2O_3S$: C, 50.58; H, 5.42. Found: C, 50.27; H, 5.37.

*Example 15*

To a solution of 31.3 grams (0.1 mol) of p-acetamidophenyl 2-(4-pyridyl)ethyl sulfone in 125 ml. of acetonitrile were added 41.4 grams (0.3 mol) of n-butyl bromide. The solution was refluxed for 18 hours, cooled, and the crystals which had formed were filtered off, washed with acetone and dried. The crystalline 4-[2-(4 - acetamidophenylsulfonyl)ethyl] - 1 - butylpyridinium bromide obtained after recrystallization from ethanol-acetone-ether, melted at 165–167° C.

Calculated for $C_{19}H_{25}BrN_2O_3S$: C, 51.70; H, 5.71. Found: C, 51.86; H, 6.00.

*Example 16*

To 31.3 grams (0.1 mol) of p-acetamidophenyl 2-(4-pyridyl)ethyl sulfone hemihydrate (prepared according to Example 9 above) were added 24.8 grams (0.15 mol) of n-hexyl bromide in 100 ml. of acetonitrile. The mixture was refluxed for 18 hours. The resulting solution was cooled and the volatiles were distilled off. The residual solid was crystallized from acetonitrile-ether. The 4 - [2 - (4 - acetamidophenylsulfonyl)ethyl] - 1 - hexylpyridinium bromide melted at 163–164° C. with decomposition.

Calculated for $C_{21}H_{29}BrN_2O_3S$: C, 53.73; H, 6.23. Found: C, 53.62; H, 6.16.

*Example 17*

4 - [2 - (4 - acetamidophenylsulfonyl)ethyl] - 1 - heptylpyridinium bromide, M. P. 173–175° C. with decomposition, was prepared from 31.3 grams (0.1 mol) of p-acetamidophenyl 2-(4-pyridyl)ethyl sulfone hemihydrate and 27 grams (0.15 mol) of heptyl bromide according to the procedure described in Example 16. The product was recrystallized from ethanol-ether.

Calculated for $C_{22}H_{31}BrN_2O_3S$: C, 54.66; H, 6.47. Found: C, 54.69; H, 6.18.

*Example 18*

4 - [2 - (4 - acetamidophenylsulfonyl)ethyl] - 1 - octylpyridinium bromide, M. P. 155–157° C., was prepared from 31.3 (0.1 mol) of p-acetamidophenyl 2-(4-pyridyl)ethyl sulfone hemihydrate and 29 grams (0.15 mol) of octyl bromide according to the procedure described in Example 16. The product was recrystallized from acetonitrile-ether.

Calculated for $C_{23}H_{33}BrN_2O_3S$: C, 55.53; H, 6.68. Found: C, 55.37; H, 6.83.

*Example 19*

4 - [2 - (4 - acetamidophenylsulfonyl)ethyl] - 1 - dodecylpyridinium bromide, M. P. 128–130° C., was prepared from 31.3 grams (0.1 mol) of p-acetamidophenyl 2-(4-pyridyl)ethyl sulfone hemihydrate and 31 grams (0.125 mol) of dodecyl bromide according to the procedure described in Example 16. The product was recrystallized from acetone-ether.

Calculated for $C_{27}H_{41}BrN_2O_3S$: C, 58.57; H, 7.47. Found: C, 58.89; H, 7.59.

*Example 20*

4 - [2 - (4 - acetamidophenylsulfonyl)ethyl] - 1 - p - nitrobenzylpyridinium bromide, M. P. 199–200° C. with decomposition, was prepared from 31.3 grams (0.1 mol) of p-acetamidophenyl 2-(4-pyridyl)ethyl sulfone hemihydrate and 24 grams (0.12 mol of p-nitrobenzyl bromide according to the procedure described in Example 16. Recrystallization of the product was effected from methanol-acetonitrile-ether.

Calculated for $C_{22}H_{22}BrN_3O_5S$: C, 50.78; H, 4.26. Found: C, 50.90; H, 4.65.

*Example 21*

12 grams (0.028 mol) of the n-propyl bromide of p-acetamidophenyl 2-(4-pyridyl)ethyl sulfone (obtained by the method described in Example 13) and 10 ml. of 48% hydrobromic acid in 100 ml. of water were reacted according to the procedure described in Example 12, to produce 4-[2-(4-aminophenylsulfonyl)ethyl]-1-propylpyridinium bromide, M. P. 188–189° C. with decomposition. The product was recrystallized from 95% ethanol-ether.

Calculated for $C_{16}H_{21}BrN_2O_2S$: C, 49.86; H, 5.49. Found: C, 50.18; H, 5.55.

*Example 22*

To 12 grams (0.028 mol) of 4-[2-(4-acetamidophenylsulfonyl)ethyl]-1-isopropylpyridinium bromide (prepared in the manner described in Example 14), dissolved in 100 ml. of water, were added 15 ml. of 48% aqueous hydrobromic acid. The solution was refluxed for 3 hours. The volatiles were distilled off and the residue was crystallized from water-ethanol. The 4-[2-(4-aminophenylsulfonyl)ethyl] - 1 - isopropylpyridinium bromide melted at 200–201° C. with decomposition.

Calculated for $C_{16}H_{21}BrN_2O_2S$: C, 49.86; H, 5.49. Found: C, 49.87; H, 5.52.

*Example 23*

15 ml. of 48% aqueous hydrobromic acid were added to 12.8 grams (0.031 mol) of 4-[2-(4-acetamidophenylsulfonyl)ethyl]-1-butylpyridinium bromide (prepared as described in Example 15), dissolved in 100 ml. of water. The solution was refluxed for 3 hours. The volatiles were distilled off and the residue was crystallized from ethanol-isopropanol. The 4-[2-(4-aminophenylsulfonyl)-ethyl]-1-butylpyridinium bromide melted at 164–165° C.

Calculated for $C_{17}H_{23}BrN_2O_2S$: C, 51.12; H, 5.80. Found: C, 50.83; H, 5.68.

*Example 24*

To 15 grams (0.03 mol) of 4-[2-(4-acetamidophenylsulfonyl)ethyl]-1-octylpyridinium bromide (prepared as described in Example 18), dissolved in 100 ml. of water, were added 15 ml. of 48% aqueous hydrobromic acid. The solution was refluxed for 3 hours. The volatiles were distilled off and the residue was crystallized from ethanol-ether. The 4-[2-(4-aminophenylsulfonyl)ethyl]-1-octylpyridinium bromide melted at 180–182° C. with decomposition.

Calculated for $C_{21}H_{31}BrN_2O_2S$: C, 55.38; H, 6.86. Found: C, 55.28; H, 6.55.

*Example 25*

2-(2-pyridyl)ethyl p-tolyl sulfone, M. P. 59–61° C., was prepared from 21.4 grams (0.12 mol) of sodium p-toluenesulfinate and 10.5 grams (0.11 mol) of 2-vinylpyridine according to the procedure described in Example 4. The product was recrystallized from 60% ethanol.

Calculated for $C_{14}H_{15}NO_2S$: C, 64.36; H, 5.79. Found: C, 64.16; H, 6.00.

An aliquot of the compound prepared above was treated with alcoholic hydrochloric acid to produce the hydrochloride of 2-(2-pyridyl)ethyl p-tolyl sulfone, M. P. 180–182° C. with decomposition. The product was recrystallized from 95% ethanol-ether.

Calculated for $C_{14}H_{15}NO_2S \cdot HCl$: C, 56.45; H, 5.42. Found: C, 56.59; H, 5.57.

*Example 26*

19.5 grams (0.075 mol) of 2-(2-pyridyl)ethyl p-tolyl sulfone (prepared according to the procedure described in Example 25) were added to 100 ml. of ice cold acetone containing 40% (by weight) of methyl bromide. The solution, in a tightly stoppered flask, was allowed to warm slowly to room temperature and then was stored overnight. The crystals which had formed were filtered off, washed with acetone and dried. The hemihydrate of the methobromide of 2-(2-pyridyl)ethyl p-tolyl sulfone, M. P. 91–93° C., was recrystallized from ethanol-acetone-ether.

Calculated for $C_{15}H_{18}BrNO_2S \cdot \frac{1}{2}H_2O$: C, 49.31; H, 5.24. Found: C, 49.08; H, 5.32.

*Example 27*

To 22 grams (0.11 mol) of p-acetaminobenzenesulfinic acid suspended in 100 ml. of water were added 10.5 grams (0.1 mol) of 2-vinylpyridine. The mixture was stirred and heated on a steam bath for 8 hours, then cooled. The crystals which had formed were filtered off, washed with water and dried. The product, p-acetamidophenyl 2-(2-pyridyl)ethyl sulfone, M. P. 169–171° C., was recrystallized from methanol-ether.

Calculated for $C_{15}H_{16}N_2O_3S$: C, 59.17; H, 5.30. Found: C, 59.04; H, 5.22.

*Example 28*

The hydrochloride of p-aminophenyl 2-(2-pyridyl)-ethyl sulfone, M. P. 188–189° C., was prepared from 6.0 grams (0.02 mol) of p-acetamidophenyl 2-(2-pyridyl)-ethyl sulfone (produced according to the procedure described in Example 27) in the manner described in Example 10 above. Recrystallization of the product was effected from water-ethanol.

Calculated for $C_{13}H_{14}N_2O_2S \cdot HCl$: C, 52.25; H, 5.06. Found: C, 52.39; H, 5.24.

*Example 29*

To an ice cold suspension of 10 grams (0.03 mol) of p-acetamidophenyl 2-(2-pyridyl)ethyl sulfone in 170 ml. of acetonitrile were added 100 ml. of acetone containing 40% (by weight) methyl bromide. The mixture was heated in a sealed tube at 100° C. for 8 hours and cooled. The crystals were filtered off, washed with acetone and dried. The methobromide of p-acetamidophenyl 2-(2-pyridyl)ethyl sulfone, upon recrystallization from methanol-ether, melted at 160–161° C. with decomposition.

Calculated for $C_{16}H_{19}BrN_2O_3S$: C, 48.13; H, 4.80. Found: C, 48.43; H, 4.95.

We claim:

1. A compound selected from the group consisting of bases having the formula

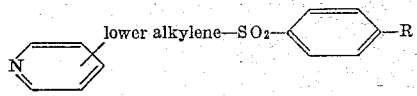

wherein R is a member of the group consisting of hydrogen, lower alkyl, amino, and acetamino, and pharmaceutically acceptable acid addition salts and quaternary salts of said bases.

2. A compound having the formula

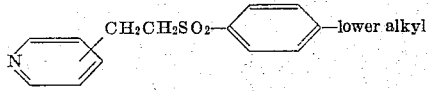

3. A compound having the formula

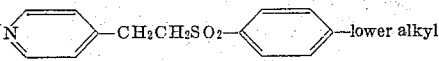

4. Pharmaceutically acceptable quaternary salts of compounds according to claim 2.

5. Alkyl halide quaternary salts of compounds according to claim 2.

6. A compound having the formula

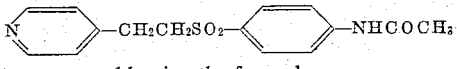

7. A compound having the formula

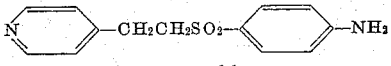

8. Pharmaceutically acceptable quaternary salts of a compound according to claim 7.

9. 4 - [2 - (4 - aminophenylsulfonyl)ethyl] - 1 - butyl - pyridinium bromide.

References Cited in the file of this patent

UNITED STATES PATENTS

| | | |
|---|---|---|
| 2,140,608 | Ufer | Dec. 20, 1938 |
| 2,657,988 | Fincke | Nov. 3, 1953 |